United States Patent
Yano et al.

(10) Patent No.: US 6,823,146 B2
(45) Date of Patent: Nov. 23, 2004

(54) IMAGE FORMING APPARATUS AND SELF-DIAGNOSIS SYSTEM

(75) Inventors: Hideyuki Yano, Shizuoka (JP); Hisahiro Saito, Shizuoka (JP); Kazuhisa Maruyama, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/217,406

(22) Filed: Aug. 14, 2002

(65) Prior Publication Data

US 2003/0044184 A1 Mar. 6, 2003

(30) Foreign Application Priority Data

Aug. 24, 2001 (JP) .......................................... 2001/254511

(51) Int. Cl.[7] .............................................. G03G 15/00
(52) U.S. Cl. ............................ 399/15; 358/1.15; 399/8; 399/81
(58) Field of Search ................................ 399/8–11, 15, 399/31, 81; 358/1.15

(56) References Cited

U.S. PATENT DOCUMENTS

| 4,651,176 A | | 3/1987 | Yamakawa et al. | |
| 5,057,866 A | * | 10/1991 | Hill et al. ........................ | 399/8 |
| 5,386,271 A | * | 1/1995 | Maekawa et al. ............... | 399/8 |
| 6,108,492 A | * | 8/2000 | Miyachi ...................... | 358/1.15 |
| 6,370,340 B1 | * | 4/2002 | Regelsberger et al. ........ | 399/10 |

FOREIGN PATENT DOCUMENTS

JP 1-253764 A * 10/1989

* cited by examiner

Primary Examiner—Susan Lee
(74) Attorney, Agent, or Firm—Fitzpatrick, Cella, Harper & Scinto

(57) ABSTRACT

An image forming apparatus and a self-diagnosis system suitable for grasping conditions relating to electrophotographic parameters of an engine in an image forming apparatus on the market, and for reducing customer complaints. The self-diagnosis system enables the electrophotographic parameters to be displayed and/or output, has a function of displaying the electrophotographic parameters by converting the electrophotographic parameters into indices other than physical quantities, the function of printing the electrophotographic parameters on an output sheet, and the function of enabling the electrophotographic parameters to be transferred to an external information apparatus by a communication device, and includes a device for transferring the electrophotographic parameters to a formatter through a video interface or from the formatter to a host computer, a computer in a service center, or the like via a communication line or the internet.

12 Claims, 5 Drawing Sheets

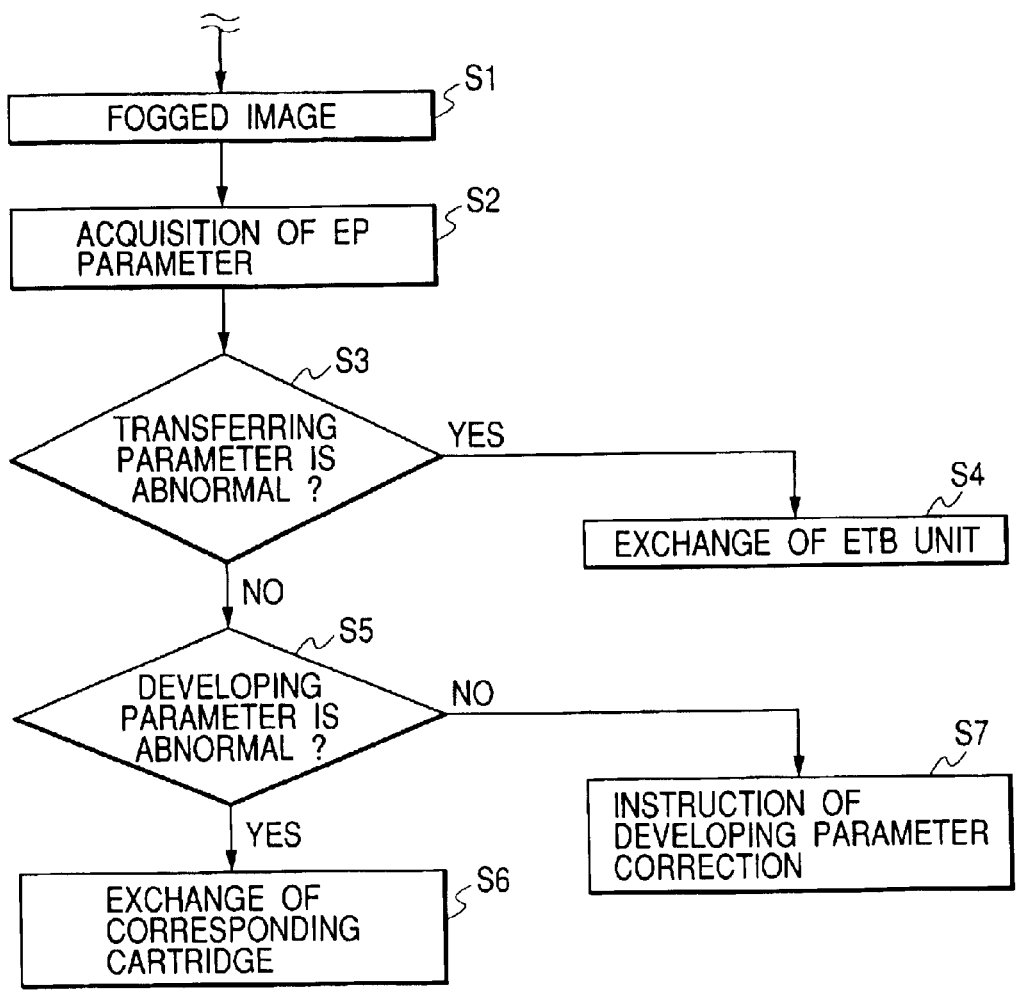

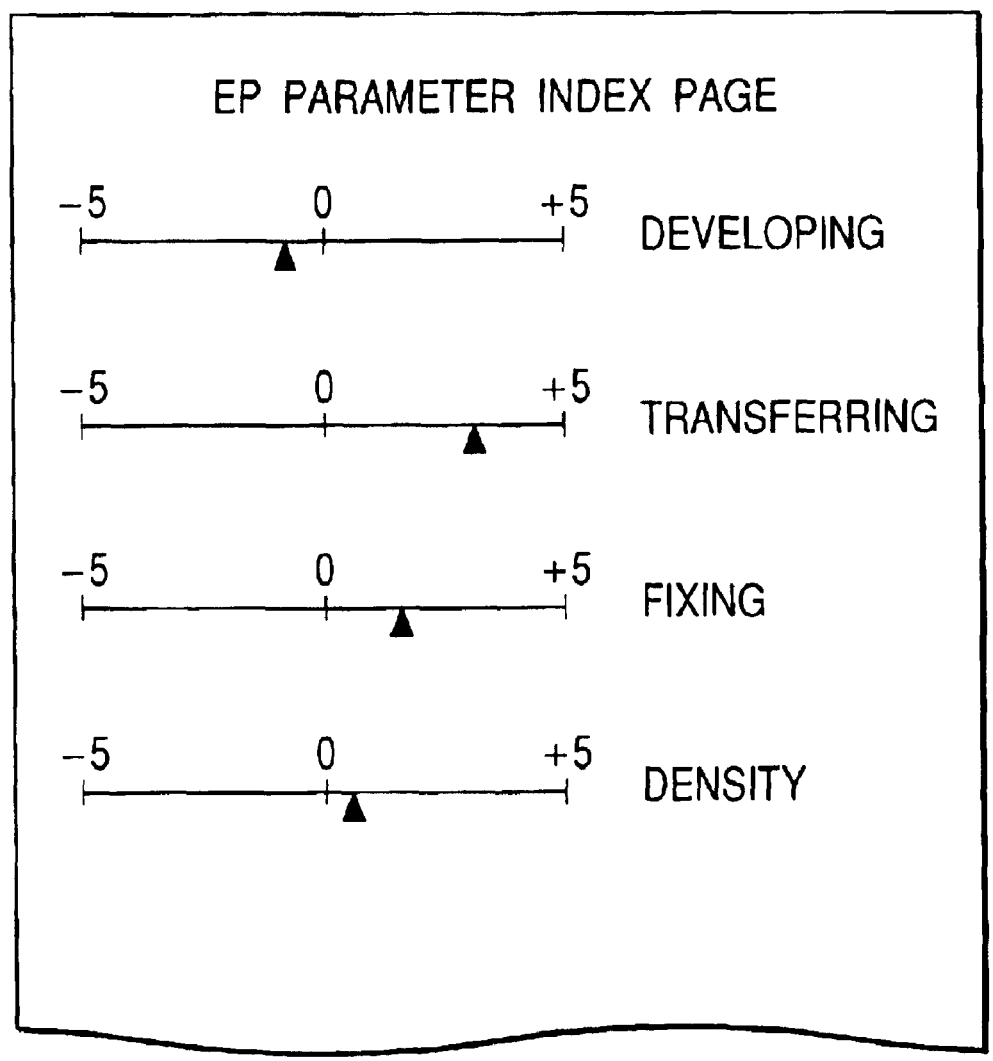

IMAGE FORMING APPARATUS AND SELF-DIAGNOSIS SYSTEM

BACKGROUND OF THE INVENTION

1. Field of the Invention

The present invention relates to an image forming apparatus such as a printer and to a self-diagnosis system.

2. Related Background Art

In recent years, the development of image forming apparatuses such as electrophotographic apparatuses having a higher operating speed and higher image quality and capable of multicolor image forming has been advanced and various types of printers are now being put on the market.

With the expansion of the market, an increasing number of requirements have been imposed on the design of printers with respect to the number of functions, performance, image quality, and environmental friendliness. The difficulty of providing printers optimized in every respect under such requirements is also being increased.

In the color printer market, the proportion of in-line machines in which a plurality of electrophotographic units for forming color images in different colors are arranged in series and are simultaneously driven to form an image is increasing. While such machines are capable of multicolor image forming at a high speed and can satisfy the needs of a great number of users, technical difficulty with such machines is becoming more considerable because of many electrophotographic parts and parameters used therein.

Electrophotographic techniques entail a problem in that it is extremely difficult for a user to ascertain a cause of an image defect which occurs in an electrophotographic image forming process, and to thereafter perform proper steps to solve the problem of image defect, because special means including static electricity is used in the image forming process.

Also, it is difficult for a service person to obtain adequate information on electrophotographic conditions at the time of occurrence of an image defect, to which various parameters relate. Even when the service person comes to the place where the image forming apparatus is installed, he or she cannot reproduce the defect with reliability. Thus, in actuality, it is extremely difficult to cope with image defects on the market.

Therefore, in many cases, service operations on image multicolor printers at the time of occurrence of image defects are not done satisfactorily for users, resulting in serious complaints from the users.

Moreover, by considering such complaints, service persons often replace parts or a main unit, even if the replacement is not actually necessary, because it is difficult to ascertain the cause. Thus, an increase in service cost results.

Ordinarily, most of the causes of image defects in an image forming apparatus are incompatibilities between electrophotographic image forming conditions set on the maker side and operating and environmental conditions on the user side, and degradation or malfunctions of electrophotographic parts including toner and a photosensitive drum. If correct information about these conditions can be obtained, it is possible to solve the problem by locating a malfunctioning portion and designating an replaceable part, or by designating a setting according to the operating and environmental conditions on the user side.

However, electrophotographic parameters are ordinarily expressed in voltage or current values which are not easily understandable by users. It is substantially impossible to expect user's understanding and determination of such parameters. Also, service persons cannot access such information unless they are on the site. Therefore it is presently difficult to use the method of changing electrophotographic parameters as an effective solution.

Further, electrophotographic parameters, large in number, are also related closely to each other. In most cases, it is ineffective to change only one parameter in correcting a malfunction or the like. On the contrary, the system may be unbalanced by changing only one parameter. In such a case, a different problem may arise as a problem of a secondary fault. The difficulty in changing electrophotographic parameters on site of the user is increased by such a secondary fault.

SUMMARY OF THE INVENTION

In view of the above-described circumstances, an object of the present invention is therefore to provide an image forming apparatus and a self-diagnosis system suitable for grasping conditions relating to electrophotographic parameters in engines of image forming apparatuses on the market, and for reducing customer complaints.

To achieve the above-described object, according to one aspect of the present invention, there is provided an image forming apparatus capable of one of displaying and outputting of electrophotographic parameters.

According to another aspect of the present invention, there is provided a self-diagnosis system including analyzing conditions in electrophotographic units in the above-described image forming apparatus on the basis of electrophotographic parameters. The parameters include an electrifying condition, an exposure condition, development conditions including a developing bias, a transfer condition, an adsorbing condition, fixing conditions including a fixing temperature, information on physical properties of electrophotographic parts, information on a temperature in the apparatus, and image density information. The system also enables the electrophotographic parameters to be changed according to the results of the analysis on the basis of an instruction from a user or a service person or on the basis of data sets each formed of a plurality of electrophotographic parameters.

According to still another aspect of the present invention, there is provided a self-diagnosis system including means for transmitting electrophotographic parameters determined by an electrophotographic engine to a formatter through a video interface or for transferring the electrophotographic parameters from the formatter to a host computer, a computer in a service center, or the like through a telephone line or the Internet.

These and other objects, features and advantages of the present invention will become apparent from the following description of embodiments of the invention in conjunction with the accompanying drawings.

BRIEF DESCRIPTION OF THE DRAWINGS

FIG. 4 is a flowchart showing an example of a routine for analysis of electrophotographic (EP) parameters obtained; and FIG. 5 is a diagram for explaining an example of indices formed from EP parameters.

DESCRIPTION OF THE PREFERRED EMBODIMENTS

Figure 1:
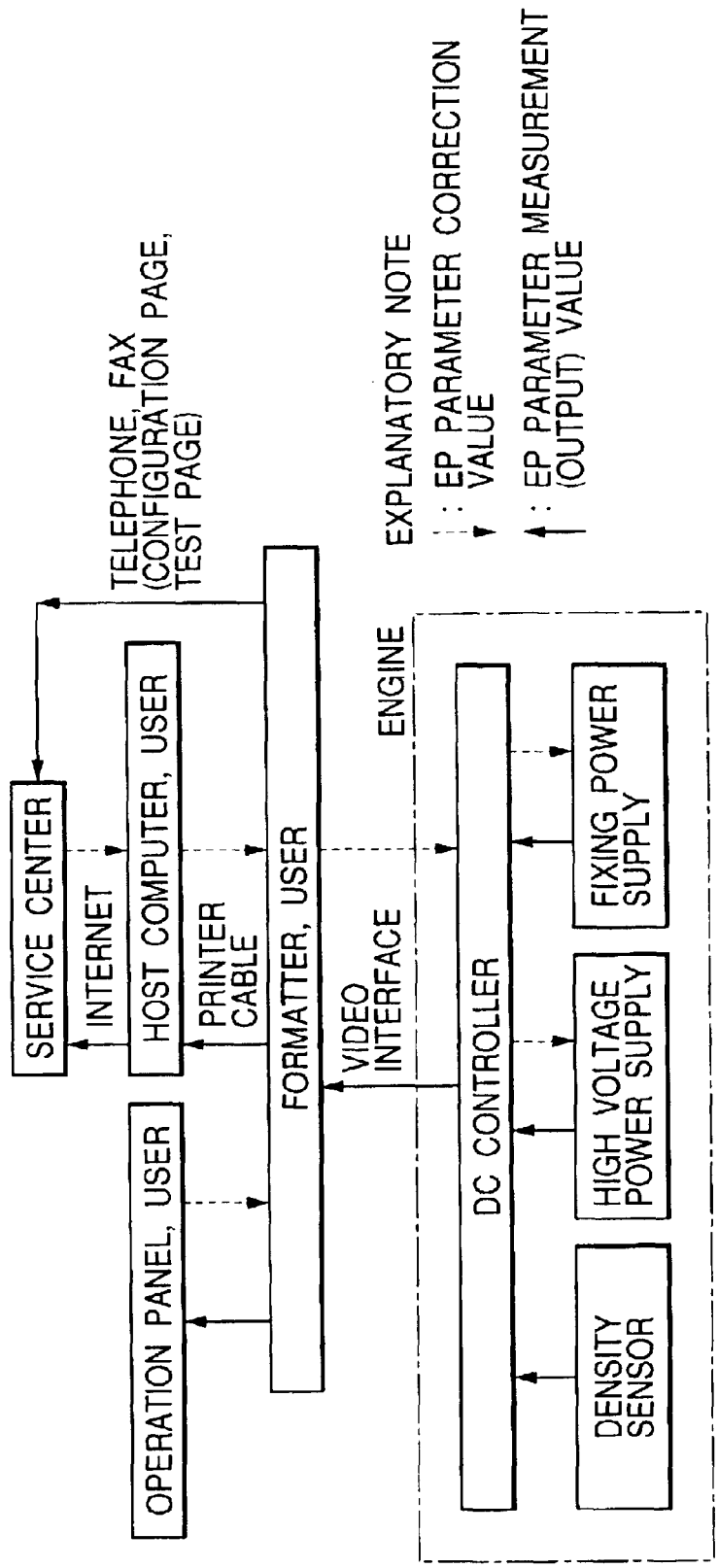
FIG. 1 is a diagram showing the configuration of a self-diagnosis system in accordance with the present invention.

Solutions described as embodiments of the present invention are generally divided into three methods described below.

<1> Method of Obtaining Electrophotographic Parameters in a Situation Where a Problem has Arisen:

A system is formed which enables a printer to display or output electrophotographic parameters. More specifically, a DC controller in an engine transmits electrophotographic parameters through a video interface (1) to be displayed on an operation panel or the printer, (2) to be displayed on a driver screen or the like of a host computer, (3) to be sent to a computer in a service center via the internet or a telephone line, or (4) to be printed directly on an output sheet, thereby enabling a user or a service person to directly obtain the electrophotographic parameters in a situation where a problem has arisen.

Preferably, the electrophotographic parameters are output by being converted into indices in several steps so as to be easily treated by a service person or a user who does not know well about electrophotographic techniques.

In products presently put on the market, an image called a configuration page is ordinarily output at the time of printer start-up. It is most practical to write electrophotographic parameters on this page or on a test print page. However, it is thought that in the future such information will be directly obtained as online information at a service center by using a certain communication means.

Under present circumstances, information on a consumable item, etc., is written on a configuration page. However, electrophotographic parameters from a printer include information which changes and varies essentially according to operating and environmental conditions under which the printer is operated on site of a user. The purpose with which information is written on a configuration page and the purpose with which electrophotographic parameters are used in accordance with the present invention are essentially different.

The means for realizing information on a configuration page or a test print page in the conventional art is a method of directly outputting information managed by a formatter. In contrast, according to the present invention, a system is newly devised in which information managed on a DC controller by an electrophotographic engine is displayed or output by being transferred to a formatter through a video interface or a communication means, and in which the information is transferred from the formatter to a host computer or a computer in a service center through a communication means such as the Internet or a telephone line.

<2> Method of Enabling Electrophotographic Parameters to be Changed On-Site in the Market:

A system is formed which enables electrophotographic parameters of a printer to be changed on-site in the market.

More specifically, electrophotographic parameters are changed by accessing a DC controller of an electrophotographic engine through a video interface to thereby solve a problem.

A user or a service person can change an electrophotographic setting in the electrophotographic engine through an operation panel of the printer or a driver screen of a host computer, or from a computer in a service center through a communication means such as a telephone line or the Internet.

At this time, to prevent the system from being unbalanced due to changing of one electrophotographic parameter, which leads to a new problem, a data set in which a certain number of related electrophotographic parameters are combined may be prepared to enable the parameters to be changed in association with each other. In this manner, the effect of this method can be improved.

<3> Method of Combining the Above-described Methods <1> and <2> to Most Effectively Cope with Problems Which Arise in the Market:

To most effectively cope with problems which arise in the market, a process is necessarily required in which the conditions of engines with which the problems exist are correctly recognized and analyzed and most suitable changes in setting are made.

As mentioned above, there is a risk of erroneous measures based on erroneous analysis causing a secondary fault. According to the present invention, to obtain correct information and provide appropriate instructions, a diagnosis system based on a combination of the above-described methods <1> and <2> is provided.

This diagnosis system is realized by a combination of acquisition of correct information based on the method <1>, and an analytical method as specified in a manual, and the method <2> for coping with problems.

Embodiments of an image forming apparatus and a self-diagnosis system in accordance with the present invention will be described below.

Figure 2:
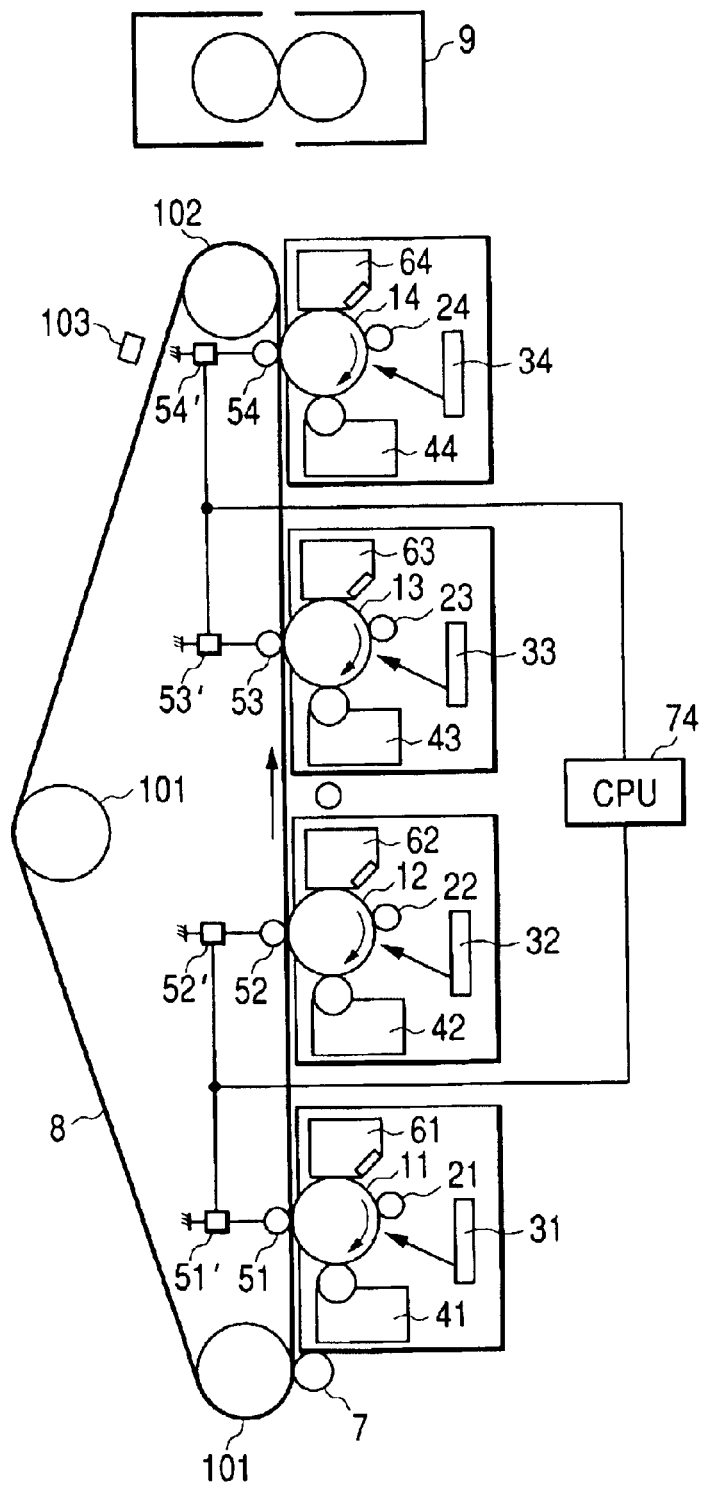
FIG. 2 is a diagram schematically showing an electrophotographic apparatus which is an example of an image forming apparatus in accordance with the present invention.
Figure 3:
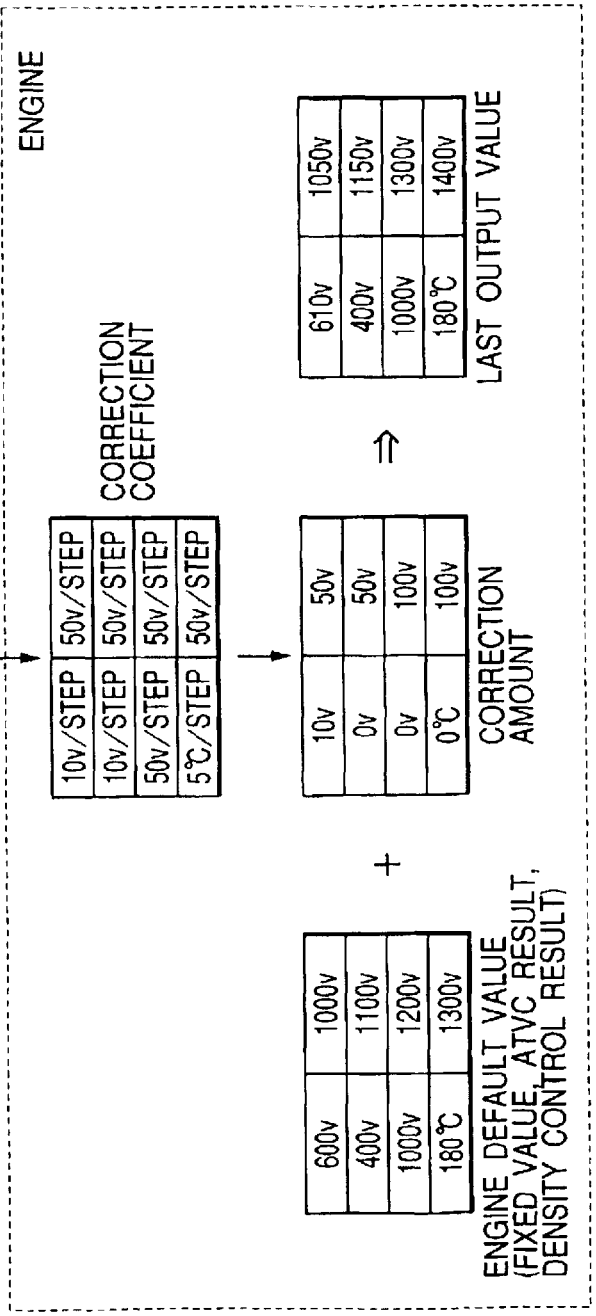
FIG. 3 is a diagram for explaining a concept of a specular reflection-type of optical sensor used in a first embodiment of the present invention.

FIG. 1 is a diagram showing the configuration of a self-diagnosis system in accordance with the present invention; FIG. 2 is a diagram schematically showing an electrophotographic apparatus which is an example of an image forming apparatus in accordance with the present invention; FIG. 3 is a diagram for explaining the concept of a specular reflection-type of optical sensor used in a first embodiment; FIG. 4 is a flowchart showing an example of a routine for analysis of electrophotographic (EP) parameters obtained; and FIG. 5 is a diagram for explaining an example of indices formed from EP parameters.

(First Embodiment)

The first embodiment is characterized in that EP parameters of an engine are printed out onto a sheet.

In a case where an image problem arises in the market, a user driven by necessity calls up a service center or a service man (service person) to explain the situation. However, it is generally difficult to verbally explain an image problem, and various conditions (information on kinds of paper, printing modes, environments, consumable items) relating to printing performed by users must be communicated. Therefore it is extremely difficult for an analyzing person to reach a correct conclusion.

For example, in a case where image fog occurs in a reversal developing-type electrophotographic apparatus, a user can express only a smudged condition of the white ground of a print. As a cause of such an image defect, various phenomena, e.g., OPC electrifying failure fog, ground fog as a result of selection of a high developing bias due to density control failure, reversal fog due to degradation of a developer, and transfer memory fog due to over-transfer are conceivable. It is difficult to provide a correction instruction unless its essential cause is identified from among such phenomena.

Therefore, there have been problems described below. To actually ascertain a cause of an image problem, a service person is required to go to the site. Even at the site, the ordinary service person cannot perform suitable steps to solve the electrophotographic problem requiring know-how. Steps actually performed for solution of the image problem lead to replacement of parts. In the case of a multicolor machine having a particularly large number of image defect checkpoints and a large number of replacement parts, an increase in service cost results.

According to the present invention, to solve these problems, electrophotographic parameters held by a DC controller of an engine are transferred to a formatter through a video interface, and the formatter writes this information on a test print page or a configuration page to enable a service center or a service person to make a correct determination.

For instance, when an image problem arises, a user makes the engine print a configuration page or a test page by resetting the engine or by providing a printing instruction. At this time, the formatter transfers electrophotographic parameters from the DC controller of the engine through a video interface, thus outputting details of the image problem.

The electrophotographic parameters to be output may be selected from various sorts of information useful in analysis of engine conditions, i.e., electrifying conditions, exposure conditions, development conditions including a developing bias, transfer conditions, adsorbing conditions, fixing conditions including a fixing temperature, information on physical properties of electrophotographic parts, information on temperatures in the machine, image density information, etc.

The user informs, by facsimile or telephone, a service center of the contents on the page on which these parameters are output and of the image problem that has occurred, thereby enabling the service center to carry out necessary steps such as changing the engine setting and designating replacement parts.

The electrophotographic parameters are essentially expressed as physical quantities such as a voltage value, a current value, a temperature and a humidity, which vary through respective ranges. Preferably, the values expressed as such physical quantities are output by being converted into indices so as to be easily interpreted by a user or a service person.

For example, a method may be used in which if it is essentially possible that the electrifying bias vary through the range from 200 to 500 V, printing is performed with an index divided into a (±5 V range, and a user may send information that the electrifying condition is +2 for example (see FIG. 5).

While an example of printing-out of electrophotographic parameters has been described, the formatter can also display the information on an operation panel and transfer the information to a host computer via a printer cable to enable the information to be displayed on a driver screen of the host computer, and the host computer can transfer the information to a service center through a communication means such as the Internet. The present invention provides a self-diagnosis system which enables a user or a service person to obtain, by these methods, electrophotographic parameters managed by an engine.

An electrophotographic apparatus which is an example of an image forming apparatus in accordance with this embodiment and a detailed example of the apparatus will be described.

FIG. 2 is a diagram schematically showing a multicolor image forming apparatus (copying machine or laser printer) using an electrophotographic process. Four independent color stations respectively having yellow (Y), magenta (M), cyan (C), and black (BK) photosensitive drums, a developing device, and a cleaning device are arranged in a row, and transfer to a sheet adsorbed to an electrostatic transferring belt (hereinafter referred to as "ETB") is performed by conveying the sheet through these stations to obtain a full-color image.

Each of the components indicated by reference numerals 11 to 14 is a rotary-drum-type of electrophotographic sensitive member (hereinafter referred to as "photosensitive drum") repeatedly used as an image bearing member. Each photosensitive drum is driven to rotate at a predetermined peripheral speed (process speed) in the clockwise direction indicated by the arrow in FIG. 2.

Each of the photosensitive drums 11 to 14 is a negatively-electrified OPC photosensitive member having a diameter of 30 mm. The process speed in the image forming apparatus of this embodiment is 94 mm/sec.

Each of the photosensitive drums 11 to 14 is uniformly electrified at a predetermined potential with a predetermined polarity by a primary electrifying roller 21, 22, 23, or 24 in a rotating cycle and then undergoes image exposure performed by an exposure device 31, 32, 33, or 34 (constituted by a laser diode, a polygon scanner, lenses, etc.), thereby forming an electrostatic latent image corresponding to one of first to fourth color-component images in desired colors (e.g., yellow-, magenta-, cyan- or black-component image).

The electrifying device is of a DC-contact-electrifying type in which electrifying is performed such that the roller to which a DC voltage of −1.2 kV is applied and which has an actual resistance of 106 Ω is maintained in contact with the photosensitive drum at a total pressure of 9.8 N. The surface of each of the photosensitive drums 11 to 14 is electrified to −600 V. Each of the exposure devices 31 to 34 used in this embodiment is a polygon scanner using a laser diode. Each exposure device converges a laser beam modulated with an image signal to a point on the corresponding the photosensitive drums 11 to 14 to form an electrostatic latent image.

Laser exposure writing is started with a delay of a predetermined time period from a position signal called BD in each polygon scanner in the main scanning direction (in the direction perpendicular to the direction of sheet conveyance) with respect to each scanning line and with a delay of a predetermined time period from a TOP signal generated from a switch in the sheet transporting path in the sub-scanning direction (corresponding to the direction of sheet conveyance), thereby enabling exposure to be performed at the same position on one sheet in each color station.

The electrostatic latent image obtained in each station is developed by a developing unit in the respective station.

Each of developing devices 41 to 44 (yellow, magenta, cyan, black) is rotated in the direction of the arrow indicated in FIG. 2 by a rotary drive device (not shown) and is arranged so as to face the corresponding photosensitive drum 11, 12, 13, or 14 in a developing cycle.

Each of Y, M, C, and BK toners provided in the developing devices 41 to 44 is a nonmagnetic toner developed by a one-component contact development method.

In each of the developing devices 41 to 44 using the nonmagnetic one-component contact development method, development is performed by using an elastic roller which is rotated forward relative to the photosensitive drum 11, 12, 13, or 14 at a peripheral speed corresponding to 170% of that of the photosensitive drum, and to which a voltage variable by a signal from the controller is applied.

The developing bias is determined by image density control, which is executed by using a combination of a halftone patch formed as an image on the ETB and a density sensor 103 for optically reading the halftone patch. In an image density control sequence, the engine forms, for example, corresponding halftone patches at several developing bias values in the range from 200 to 500 V on the ETB without paper, and light reflected from the patches is detected with the density sensor 103. The DC controller of the engine selects the developing bias value by which a detection result closest to a predetermined quantity of light is obtained, and determines this value as the developing bias to be used at the time of printing.

The transfer belt 8 is driven to rotate in the direction of the arrow at the same peripheral speed as that of the photosensitive drums 11 to 14.

The transfer belt 8 is a 130 μm thick single-layer resin belt whose volume resistivity is adjusted to 1010 Ωcm by dispersing carbon black in a PET resin. The transfer belt 8 has ribs bonded and fixed to opposite side portions of its back surface, whereby meandering and one-sidedness of the belt are limited.

Transfer rollers 51 to 54 made of a urethane resin to which a high voltage can be applied and whose volume resistivity is adjusted to 107 Ωcm are used as a transfer member. Each of the transfer rollers 51 to 54 is pressed against the OPC nip portion from the back surface of the ETB.

A sheet fed from a sheet cassette passes a registration roller, then passes through a nip between the transfer belt 8 and an adsorbtion roller 7, and is adsorbed to the transfer belt 8 by electrostatic attraction.

The transfer roller 7 has such a structure that a core metal having a diameter of 6 mm, and solid rubber formed on the core metal, and a high-voltage bias for attraction can be applied to the core metal.

The adsorbtion roller 7 is a solid rubber roller made of EPDM rubber in which carbon black is dispersed for resistivity adjustment, and which has a diameter of 12 mm. The resistance value between the core metal of the adsorbtion roller 7 and a 1 cm-wide strip of metallic foil wrapped around the surface when a voltage of 500 V is applied between the foil and the core metal is adjusted to 105 Ω.

When the sheet adsorbed to the transfer belt 8 passes through each of the color stations, the toner image having one of the different colors is transferred from the photosensitive drum 11, 12, 13, or 14, thereby forming a full-color image.

The transferring bias is determined by control called automatic transfer voltage control (ATVC). The engine causes a constant current to flow through each of the transfer rollers 51 to 54 during pre-rotation, detects the impedance of the transferring unit from the transfer voltage generated at this time, and performs, at the time of printing, transfer at a constant voltage set according to the impedance of the transferring unit by using a predetermined relational expression.

The sheet separated at the rear end of the transfer belt 8 by the effect of the curvature undergoes fixing in a heating roller fixing device 9 and is discharged out of the apparatus to be obtained as a finished print.

For example, the transferring bias is controlled in such a manner that a CPU 74 in the DC controller of the engine issues an instruction to each of high-voltage sources 51' to 54' and the voltage source outputs the transferring bias according to this instruction. The electrifying bias, the developing bias, the fixing temperature, etc., are also controlled by the DC controller.

As described above, the developing bias is a value determined by image density control, while the transferring voltage is a value determined by the ATVC both of which are provided by the DC controller of the engine. These values may vary in the market depending on operating environments on sites of users, the durability of cartridges in terms of number of sheets, and the degree of engine endurance degradation.

In this embodiment, as shown in FIG. 1, the DC controller of the engine notifies the formatter of these values through the video interface.

A further description will be made by assuming that the user makes a service call in a case where development fog occurs.

When the user makes a call on the service center, the service center requests the user to output a test print and to send the indices for the developing biases and the indices for the transferring biases written on the output test print, or to send the entire output print by facsimile.

In the service center, it is possible to analyze the electrophotographic parameters, i.e., the developing and transferring biases, to ascertain whether the cause of the fog exists in the transferring units or developing units which is assumed to be a place where the cause exists.

If each transferring bias notified from the user is within the presupposed range, the possibility of the cause of the problem existing in the transferring units is regarded as zero and each of the developing bias values related to the colors is checked. If the developing bias related to black is recognized as an abnormal value, it can be supposed that the cause of the problem exists in the cartridge, and the service center can provide an instruction to change the black cartridge.

While in the case of the conventional service the cause of problems cannot be located and a service person is required to go to the site or to instruct replacement of ETB and all the cartridges, the self-diagnosis system of the present invention enables immediate appropriate service on the market and is effective in reducing the service cost.

(Second Embodiment)

According to the present invention, electrophotographic parameters obtained by the method explained in the description of the first embodiment are analyzed and the electrophotographic parameters of the engine are changed to solve an image problem.

There has been a problem that when an image problem arises, it is not possible to ascertain whether the problem is due to an operating condition on site of a user (an environmental condition, the state of an consumable item, or a medium used) or due to a fault in engine parts (malfunction or wear) and, therefore, it is difficult to make a decision on whether a step of changing electrophotographic parameters should be performed.

According to the present invention, however, it is possible to definitely locate the cause of an image defect in a certain area and therefore to easily correct the defect by instructing a user to change parameters related to the abnormality.

If it is clear that there is no problem with the engine and that the image defect is due to an operating or environmental condition on site of the user which is not presupposed, the user may be individually instructed to perform the step effectively in solving the problem which was unsolvable by the conventional method.

An example of the solution according to the second embodiment of the present invention will be described.

In this embodiment, the engine can change electrophotographic parameters according to commands given through the video interface, as shown in FIG. 3.

If there is a need for correction, the user inputs a correction value through the operation panel or the driver screen of the host computer according to an instruction from the service center or on the basis of his or her decision.

Alternatively, mediums on which a printer driver including correction values are stored may be distributed from the service center, or the engine may be directly accessed from the service center through a communication means such as the Internet to enable correction of the electrophotographic parameters.

To start printing, the engine first sets electrophotographic output values determined by density control, ATVC or the like in the engine. If correction values are sent from the formatter through the video interface, the engine makes corrections with respect to the output values determined and set previously and performs image forming by using the corrected values.

At the time of designation of correction values, set values may be individually designated in the electrophotographic parameters. In this embodiment, however, the kinds and the number of correctable electrophotographic parameters are determined in advance and the correctable electrophotographic parameters are grouped into data sets.

In electrophotographic apparatuses, process elements are closely related to each other. In many cases, therefore, if one parameter is changed, the system is unbalanced to cause another problem.

For instance, if the transferring bias in the first station alone is corrected for the purpose of removing transfer failure due to deficiency of the transferring bias in the first station, transfer failure in the second and other subsequent stations is caused by electric charge applied onto the medium at the first station. Such a phenomenon makes it difficult to achieve immediate appropriate service on the market.

Thus, there is a need to correct all the parameters relating to transfer when one of the transfer parameters is corrected. In this embodiment, therefore, each group of parameters related to each other as in the above-described case is formed as a data set in which the parameter values are changed in association with each other.

According to the concept of data sets, a method is used in which values set to zero are outputted as correction values if there are no correction values, thereby enabling the load of implementation of components in firmware form to be reduced.

Thus, the concept of data sets is adopted to configure the system so that parameters are corrected in association with each other, thus making it possible to prevent a secondary fault which can occur easily in the case where the electrophotographic parameters are corrected individually.

In this embodiment, as described above, a user or a service person is enabled to change the electrophotographic parameters of the engine through the video interface, and the concept of data sets is adopted to carry out suitable steps for correction of image detects on the market without causing a secondary fault.

(Third Embodiment)

In the third embodiment of the present invention, a model for a self-diagnosis system based on a combination of the first and second embodiments is provided.

At the service center, information on the engine on site of a user can be obtained on the basis of the method explained in the description of the first embodiment.

In the service center, analysis is performed in accordance with a predetermined routine on the basis of the obtained information or individually according to a situation, as shown in FIG. 4, thereby enabling determination of a suitable solution.

The routine for analyzing EP parameters will be described with reference to the flowchart of FIG. 4.

If development fog is found in step S1, EP parameters are obtained in step S2. A determination is made in step S3 as to whether there is an abnormality in the transferring parameters. If the result of this determination is YES, that is, there is an abnormality, the process advances to step S4 and the corresponding ETB unit is replaced. If the result of the determination in step S3 is NO, that is, there is no abnormality in the transferring parameters, the process moves to step S5 and a determination is made as to whether there is an abnormality in the developing parameters. If the result of this determination is YES, that is, there is an abnormality, the process advances to step S6 and the corresponding cartridge is replaced. If the result of the determination in step S5 is NO, that is, there is no abnormality, the process moves to step S7 and an instruction is provided to correct the developing parameters.

According to the determined solution, an instruction is issued to the user's engine by the method explained in the description of the second embodiment, thereby enabling a suitable step to be carried out.

A service operation to be carried out by a service person by going to the site as in the conventional method can be performed from an off-site point, i.e., a service center in a remote control manner on the basis of a combination of the first and second methods in accordance with the present invention.

This diagnosis system enables correct diagnosis of the engine conditions while reducing the service cost, and thereby reduces the occurrence of unnecessary parts replacement and the time required to cope with market needs, thus achieving advantageous effects.

According to the embodiments of the present invention, as described above, (1) A system in which electrophotographic parameters held by an engine is obtained by printing via a video interface or being displayed on an operation panel or a screen of a personal computer is used to ascertain the cause of any defect which occurs on site of a user.

(2) A user or a service person is enabled to change the electrophotographic parameters of the engine or designate changes in the parameters through the video interface to correct an image defect.

(3) The above-described means for obtaining the electrophotographic parameters from the engine are used, engine condition analysis is performed on the basis of the obtained parameters, and an instruction based on the results of the analysis is sent to the engine, thus achieving speedy low-cost service in a remote control manner.

In short, a user or a service person can obtain engine information including EP parameters through a formatter, self-diagnosis on the machine is performed on the basis of the information, and the user is instructed through a communication means such as a telephone or the Internet to perform on-site adjustment of the engine on the basis of the results of the self-diagnosis or an instruction is provided directly to the engine to perform the same adjustment, thus enabling correction of a fault or achieving speedy low-cost service.

The present invention has been described with respect to the preferred embodiments thereof. Needless to say, the present invention is not limited to the described embodiments, and various changes and modifications can be made in the described embodiments without departing from the scope of the invention as set forth in the appended claims.

What is claimed is:

1. An image forming apparatus comprising:

an electrophotographic engine adapted to form an image by an electrophotographic process;

a detector adapted to detect a density of a patch formed by said electrophotographic engine;

a first controller adapted to set a development bias as an electrophotographic control parameter of said electrophotographic engine based on a detection result of said detector;

a second controller adapted to control said electrophotographic engine to form an image representing the electrophotographic control parameter set by said first controller.

2. An image forming apparatus according to claim 1, further comprising a converter adapted to convert the electrophotographic control parameter to an index so as to be easily interpreted, wherein said second controller controls said electrophotographic engine to form an image representing graphically the index.

3. An image forming apparatus according to claim 1, further comprising a transmitter adapted to transmit the electrophotographic control parameter to external information device.

4. An image forming apparatus according to claim 1, wherein the electrophotographic control parameter set by first controller is changeable by a user.

5. An image forming apparatus according to claim 1, further comprising an operation unit adapted to input a value for changing the electrophotographic control parameter set by said first controller.

6. An image forming apparatus according to claim 1, wherein the electrophotographic control parameter comprises a value concerning at least one of electrifying, exposure, development, transferring, absorbing, and fixing.

7. An image forming apparatus comprising:

an electrophotographic engine adapted to form an image by an electrophotographic process;

a detector adapted to detect an impedance of a transfer unit of said electrophotographic engine when a constant current flows through said transfer unit;

a first controller adapted to set a transfer voltage as an electrophotographic control parameter of said electrophotographic engine based on a detection result of said detector; and a second controller adapted to control said electrophotographic engine to form an image representing the electrophotographic control parameter set by said first controller.

8. An image forming apparatus according to claim 7, further comprising a converter adapted to convert the electrophotographic control parameter to an index so as to be easily interpreted, wherein said second controller controls said electrophotographic engine to form an image representing graphically the index.

9. An image forming apparatus according to claim 7, further comprising a transmitter adapted to transmit the electrophotographic control parameters to an external information device.

10. An image forming apparatus according to claim 7, wherein the electrophotographic control parameter set by said first controller is changeable.

11. An image forming apparatus according to claim 10, further comprising an operation unit adapted to input a value for changing the electrophotographic control parameter set by said first controller.

12. An image forming apparatus according to claim 7, wherein the electrophotographic control parameter further comprises a value concerning at least one of a electrifying, exposure, development, transferring, absorbing, and fixing.

* * * * *

UNITED STATES PATENT AND TRADEMARK OFFICE
CERTIFICATE OF CORRECTION

PATENT NO. : 6,823,146 B2
DATED : November 23, 2004
INVENTOR(S) : Hideyuki Yano et al.

It is certified that error appears in the above-identified patent and that said Letters Patent is hereby corrected as shown below:

Column 1,
Line 63, "an replaceable" should read -- a replaceable --.

Column 3,
Line 13, "Arisen:" should read -- arisen: --.

Column 6,
Line 36, "the photosensitive" should read -- photosensitive --; and
Line 55, "drum" should read -- drums --.

Column 8,
Line 21, "is" should read -- are --.

Column 9,
Line 54, "detects on" should read -- defects in --.

Column 11,
Line 10, "detector;" should read -- detector; and --.

Signed and Sealed this

Twenty-fourth Day of May, 2005

JON W. DUDAS
*Director of the United States Patent and Trademark Office*